US012053353B2

(12) United States Patent
Faxon et al.

(10) Patent No.: US 12,053,353 B2
(45) Date of Patent: Aug. 6, 2024

(54) LIVESTOCK INJECTION GUN SLEEVE AND METHOD OF USE

(71) Applicant: 307 Cattle Innovations, LLC, Casper, WY (US)

(72) Inventors: Greg Faxon, Casper, WY (US); Toby Hoffman, Casper, WY (US)

(73) Assignee: 307 Cattle Innovations, LLC, Casper, WY (US)

( * ) Notice: Subject to any disclaimer, the term of this patent is extended or adjusted under 35 U.S.C. 154(b) by 362 days.

(21) Appl. No.: 17/360,180

(22) Filed: Jun. 28, 2021

(65) Prior Publication Data

US 2022/0054245 A1 Feb. 24, 2022

Related U.S. Application Data

(60) Provisional application No. 63/044,688, filed on Jun. 26, 2020.

(51) Int. Cl.
*A61D 7/00* (2006.01)
*A61D 99/00* (2006.01)

(52) U.S. Cl.
CPC ............... *A61D 7/00* (2013.01); *A61D 99/00* (2013.01)

(58) Field of Classification Search
CPC ................................ A61D 7/00; A61D 99/00
See application file for complete search history.

(56) References Cited

U.S. PATENT DOCUMENTS

| | | | | |
|---|---|---|---|---|
| 5,964,736 A * | 10/1999 | Lane | A61M 5/31581 | 604/233 |
| 2015/0073354 A1* | 3/2015 | Creaturo | A61M 5/31505 | 604/189 |
| 2016/0166761 A1* | 6/2016 | Piehl | A61B 17/3498 | 604/207 |

* cited by examiner

*Primary Examiner* — Nathan R Price
*Assistant Examiner* — John A Doubrava
(74) *Attorney, Agent, or Firm* — Schmeiser, Olsen & Watts LLP

(57) ABSTRACT

The disclosed sleeve according to various aspects of the present technology may comprise a tubular body adapted to be fitted around a barrel of an injection gun. The tubular body may comprise an interior surface and an exterior surface. The interior surface may define a cavity in the tubular body for receiving the barrel of the injection gun, wherein the interior surface may be configured to enclose the barrel of the injection gun. The exterior surface may comprise at least one marking formed thereon. The sleeve may also comprise an open first end terminating in a first peripheral annular edge and an open second end opposite the open first end and terminating in a second peripheral annular edge.

4 Claims, 3 Drawing Sheets

LIVESTOCK INJECTION GUN SLEEVE AND METHOD OF USE

CROSS-REFERENCE TO RELATED APPLICATION

This application claims the benefit of U.S. Provisional Patent Application Ser. No. 63/044,688, filed on Jun. 26, 2020, and incorporates the disclosure of the application in its entirety by reference.

BACKGROUND OF THE TECHNOLOGY

Various regulations require certain fluids, such as vaccines, antibiotics, hormones, etc. to be administered to livestock, such as cattle, by injection. Injections are typically administered to livestock using an injection gun. A conventional injection gun typically has a barrel for holding the fluid, a syringe for expelling the fluid through a discharge orifice at an end of the barrel, and a hypodermic needle connected to the discharge orifice for directing the flow of the fluid into the livestock.

The barrel of a conventional injection gun is susceptible to damage, including marring, scratching, etc. and contamination from other liquids, dust, or debris, with which the barrel may come into contact. In addition, the barrel of a conventional injection gun is typically made of materials that do not properly insulate the fluid contained inside the barrel. Further, conventional methods for identifying the fluid contained in a conventional barrel may require a person, such as a cattle rancher, to read fine print located on the injection gun, which may be cumbersome and time-consuming.

Accordingly, what is needed is a method and/or apparatus to protect the barrel of an injection gun and the fluid contained in the barrel while simplifying conventional methods for identifying the fluid contained in the barrel so that a proper dose of the fluid may be efficiently and safely administered to livestock.

SUMMARY OF THE TECHNOLOGY

The disclosed sleeve according to various aspects of the present technology may comprise a tubular body adapted to be fitted around a barrel of an injection gun. The tubular body may comprise an interior surface and an exterior surface. The interior surface may define a cavity in the tubular body for receiving the barrel of the injection gun, wherein the interior surface may be configured to enclose the barrel of the injection gun. The exterior surface may comprise at least one marking formed thereon. The sleeve may also comprise an open first end terminating in a first peripheral annular edge and an open second end opposite the open first end and terminating in a second peripheral annular edge.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

DETAILED DESCRIPTION OF EXEMPLARY EMBODIMENTS

The present technology may be described herein in terms of functional block components. Such functional blocks may be realized by any number of components configured to perform the specified functions and achieve the various results. For example, the present technology may employ various barrels, injection guns, needles, nozzles, sleeves, syringes, and the like, which may carry out a variety of functions. In addition, the present technology may be practiced in conjunction with any number of injection gun assemblies and any one of various injection guns, and the sleeve described herein is merely one exemplary application for the technology.

Figure 1:
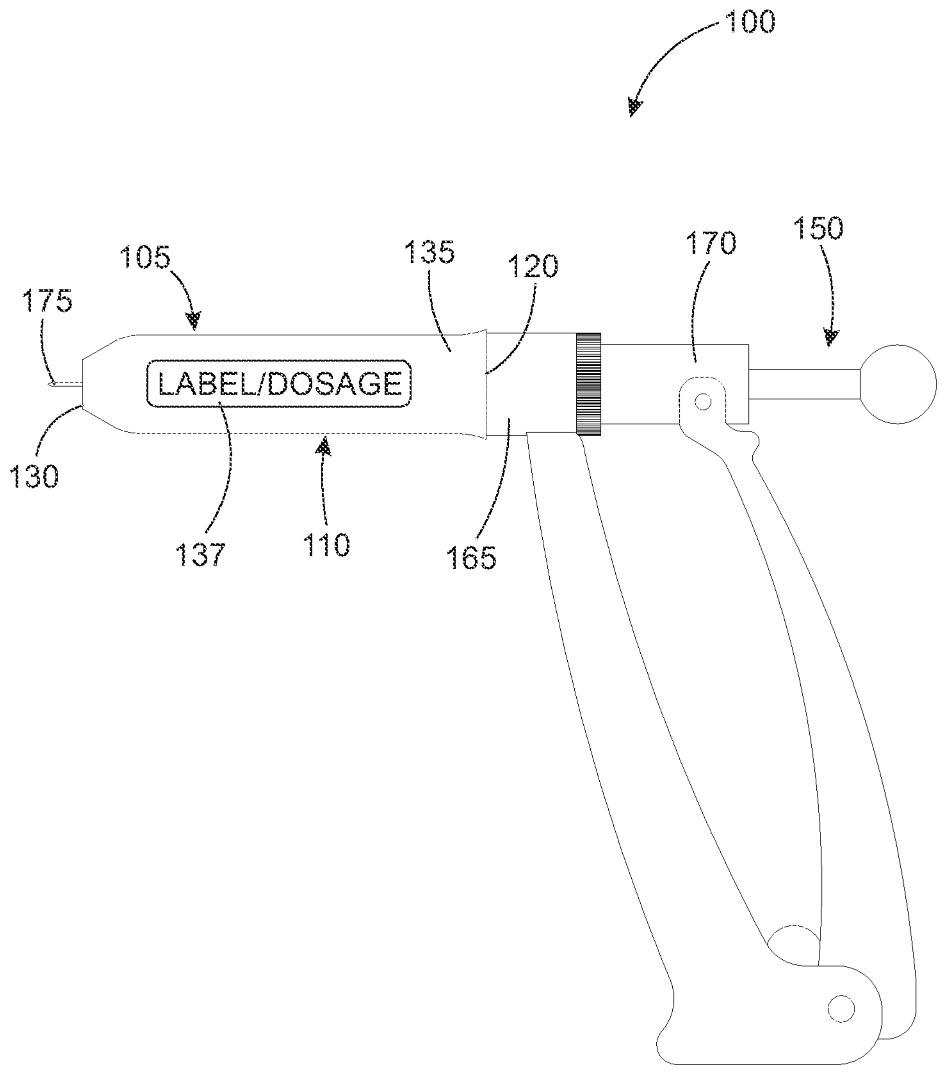
FIG. 1 representatively illustrates a perspective view of an injection gun assembly, with an exemplary sleeve fitted around a barrel of an injection gun, in accordance with an embodiment of the present technology.
Figure 2:
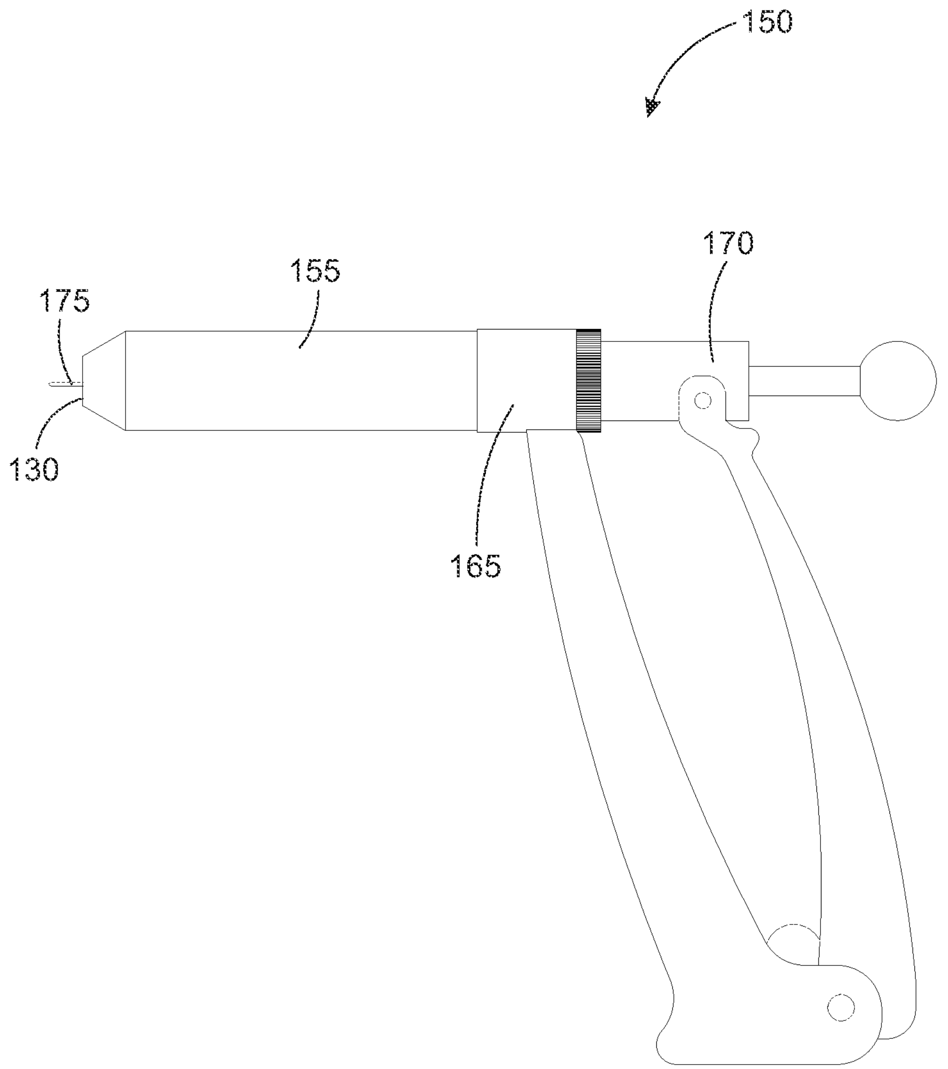
FIG. 2 representatively illustrates a perspective view of the injection gun illustrated in FIG. 1.
Figure 3:
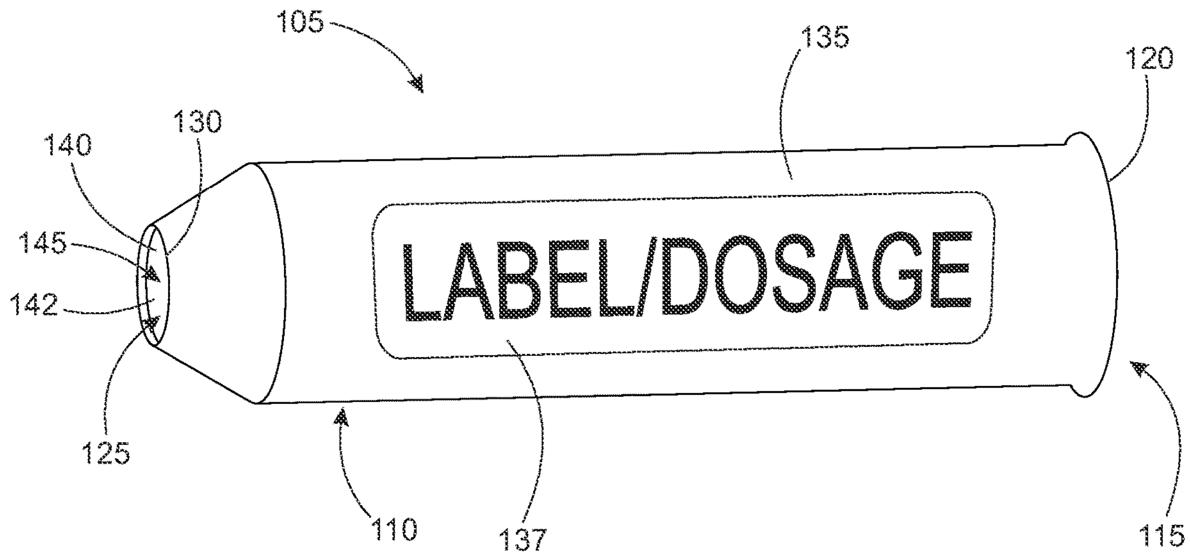
FIG. 3 representatively illustrates a perspective view of the sleeve illustrated in FIG. 1.

Referring to FIGS. 1-3, in various embodiments, an injection gun assembly 100 may comprise an exemplary sleeve 105 adapted to be fitted around a barrel 155 of an injection gun 150. The barrel 155 of the injection gun 150 may hold any fluid suitable for injection into livestock, such as vaccines, vitamins and minerals, antibiotics, anti-inflammatory drugs, hormones, antiparasitic medications, and the like.

The sleeve 105 may comprise a tubular body 110, an open first end 115 terminating in a first peripheral annular edge 120, and an open second end 125 opposite the open first end 115, where the open second end 125 may terminate in a second peripheral annular edge 130. The tubular body 110 may comprise an exterior surface 135 and an interior surface 140. The exterior surface 135 may comprise at least one marking 137 formed thereon, and the interior surface 140 may define a cavity 145 in the tubular body 110 for receiving the barrel 155 of the injection gun 150. Accordingly, the interior surface 140 of the sleeve 105 may be configured to enclose the barrel 155 of the injection gun 150 when the sleeve 105 is fitted around the barrel 155, as shown in FIG. 1.

The first and second ends 115, 125 of the sleeve 105 may be of any suitable size or shape so as to allow each end 115, 125 to fit around the barrel 155 of the injection gun 150. As an example, the open first end 115 may be fitted around a tip of the barrel 155, and the sleeve 105 may be pushed towards a handle 165 of the injection gun 150 so that the tubular body 110 may slide over the barrel 150 until the open first end 115 is positioned adjacent to the handle 165. The handle 165 may be connected to a syringe 170 configured to expel the fluid through a discharge orifice (not shown) at the tip of the barrel 155. Because the sleeve 105 may have a length substantially equal to the length of the barrel 155, when the interior surface 140 of the tubular body 140 encloses the barrel 155 and the open first end 115 is positioned adjacent to the handle 165, the open second end 125 may be positioned adjacent to a hypodermic needle 175 extending from the tip of the barrel 155. The hypodermic needle 175 may direct the flow of the fluid into and out of the barrel 155.

In various embodiments, the at least one marking 137 formed on the exterior surface 135 of the tubular body 110 may comprise one or more indicators, symbols, words, phrases, or other information to indicate an injection fluid. Specifically, the at least one marking 137 may indicate the injection fluid contained in the barrel 155 that the sleeve 105 encloses. The at least one marking 137 may also indicate the dose of the injection fluid contained in the barrel 155 that the sleeve 105 encloses. For example, the at least one marking 137 may comprise any suitable marking to distinguish one injection fluid from the other, such as "Pneumonia Vaccine" or "Swine Wormer," and the like. Similarly, the at least one marking 137 may comprise any suitable marking to distinguish one dose from the other, such as "25 mL" or "50 mL," and the like. The at least one marking 137 may, however, be configured in any suitable manner for clearly indicating an injection fluid and/or its dose. Thus, any suitable person, such as a cattle rancher, may easily identify the injection fluid and/or dose of the injection fluid associated with a particular injection gun 150 without needing to read fine print located on the injection gun 150. Accordingly, a proper dose of the injection fluid may be efficiently and safely administered to the livestock via the needle 175.

It will be appreciated that modifications may be made to the at least one marking 137 without departing from the scope of the invention. For example, the at least one marking 137 as shown in FIGS. 1 and 3 may instead comprise various symbols, colors, textures, or patterns configured to indicate an injection fluid and/or its dose. Alternatively, the at least one marking 137 may be used for advertising, branding, and/or cosmetic purposes. The at least one marking 137 may be formed on the exterior surface 135 of the sleeve 105 in any suitable manner, such as by printing, embroidering, embossing, debossing, or the like.

In some embodiments, the sleeve 105 may be "friction-fitted" to the barrel 155 of the injection gun 150, such that the sleeve 105 may be prevented from sliding, relative to the barrel 155, when the sleeve 105 is placed around the barrel 155. For instance, the interior surface 140 of the sleeve 105 may comprise a friction layer 142 configured to be positioned against an outer periphery of the barrel 155 of the injection gun 150 when the interior surface 140 of the sleeve 105 encloses the barrel 155. Accordingly, the friction layer 142 may be configured to constrain a movement of the sleeve 105 with respect to the barrel 155 of the injection gun 150.

It will be appreciated that, in some embodiments, the sleeve 105 may be constructed from an inflexible material. For example, in some embodiments, the sleeve 105 may be constructed from a variety of suitable metal materials, such as steel, iron, copper, titanium, zinc, magnesium, aluminum, or any other combination of metal materials. In other embodiments, the sleeve 105 may be constructed from a variety of suitable wood materials, such as birch, maple, or any other combination of wood materials.

It will also be appreciated that, in some embodiments, the sleeve 105 may be constructed from a flexible material. For example, in one embodiment, the sleeve 105 may in and of itself be formed from a pliable strip of material that provides enough stretch elasticity to fit a variety of barrel sizes. In some embodiments, the sleeve 105 may be adjustable to provide a more customizable fit around the barrel 155 of the injection gun 150. In one embodiment, the open second end 125 of the sleeve 105 may be tapered so that it may conform to the tapered shape of the barrel 155. In some embodiments, the pliable strip may be constructed from a variety of suitable elastomeric compounds, such as silicone rubber, styrene-butadiene rubber, butadiene, styrene monomers, polybutadiene, polychloroprene butyl rubber, isobutylene, isoprene, natural rubber, partially vulcanized natural rubber, or any combination of suitable elastomeric compounds. In other embodiments, the pliable strip may be constructed from a variety of suitable stretchy materials or fabrics, such as elastic fabric, elastane, microfibers, nylon, polyester, stretchy mesh fabric, cotton, wool, or any combination of suitable fabrics.

Modifications may be made to the sleeve 105 without departing from the scope of the invention. For example, in some embodiments, the exterior surface 135 and/or the interior surface 140 of the tubular body 110 may comprise one or more layers of protective "padding" to increase the thickness of the tubular body 110. In some embodiments, the layers of protective "padding" may be constructed from a variety of insulative materials. The sleeve 105 may, however, be configured in any suitable manner to protect the barrel 155 of the injection gun 150.

The sleeve 105 may protect the barrel 155 of the injection gun 150 from being scratched, marred, or otherwise damaged in the case the injection gun 150 is dropped, banged against another object, or otherwise contacts another object. In addition, the sleeve 105 may protect the barrel 155 from being contaminated by other liquids, dust, or debris, with which the barrel 155 may come into contact. Further, the sleeve 105 may protect the injection fluid inside the barrel 155 by insulating the injection fluid to prevent it from being damaged or otherwise tainted. For example, some injection fluids may be damaged or otherwise tainted if they are exposed to ultraviolet (UV) rays. Accordingly, the sleeve 105, when fitted around the barrel 155 of the injection gun 150, may protect the injection fluid inside the barrel 155 by insulating it from the surrounding environment.

In operation, the sleeve 105 may be fitted around the barrel 155 of the injection gun 150 by fitting the tip of the barrel 155 through the open first end 115 and then pushing and twisting the tubular body 110 of the sleeve 105 towards the handle 165 so that the barrel 155 may extend through the cavity 145 until the needle 175 extends outwards from the open second end 125. Because the sleeve 105 may comprise at least one marking 137 formed on the exterior surface 135 of the tubular body 110, any suitable person, such as a cattle rancher, may easily identify the injection fluid and/or dose of the injection fluid associated with the injection gun 150 without needing to read fine print located on the injection gun 150. Accordingly, a proper dose of the injection fluid may be efficiently and safely administered to the livestock via an injection. After use, the sleeve 105 may be removed from the barrel 155 of the injection gun 150 by grasping the tubular body 110 of the sleeve 105 and sliding it, in a twisting motion, along the barrel 155 and away from the handle 165 of the injection gun 150 to allow it to be withdrawn from the barrel 155.

In the foregoing specification, the technology has been described with reference to specific exemplary embodiments. Various modifications and changes may be made, however, without departing from the scope of the present technology as set forth in the claims. The specification and figures are illustrative, rather than restrictive, and modifications are intended to be included within the scope of the present technology. Accordingly, the scope of the technology should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims. Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise," "comprises," "comprising," "having," "including," "includes," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method, comprising:

selecting a flexible sleeve comprising a tubular body having one or more layers of padding formed of insulative material on an interior surface of the tubular body, wherein the flexible sleeve comprises a color and a first marking formed on an outer surface thereof, wherein the color and the first marking indicate an injection fluid type;

sliding the flexible sleeve around a barrel of an injection gun, wherein the injection gun comprises a second marking formed thereon indicating an injection fluid type within the injection gun;

viewing the first marking, wherein the injection fluid type identified by the color and the first marking corresponds to the injection fluid type identified by the second marking; and protecting and insulating the injection gun and the injection fluid type within the injection gun from damage and contamination in response to the flexible sleeve sliding around the barrel of the injection gun.

2. The method of claim 1, wherein the first marking comprises at least one of a color, letter, word, symbol, image, or a combination thereof.

3. The method of claim 1, wherein the first marking indicates a fluid contained in the barrel of the injection gun identified by the second marking.

4. The method of claim 3, wherein the first marking further indicates a dose of the fluid contained in the barrel of the injection gun identified by the second marking.

* * * * *